United States Patent
Horisawa (10) Patent No.: US 9,130,993 B2
(45) Date of Patent: *Sep. 8, 2015

(54) WIRELESS CONNECTION SYSTEM AND WIRELESS CONNECTION METHOD

(75) Inventor: Shozo Horisawa, Chiba (JP)

(73) Assignee: Sony Corporation, Tokyo (JP)

( * ) Notice: Subject to any disclaimer, the term of this patent is extended or adjusted under 35 U.S.C. 154(b) by 836 days.

This patent is subject to a terminal disclaimer.

(21) Appl. No.: 11/699,886

(22) Filed: Jan. 30, 2007

(65) Prior Publication Data

US 2007/0184816 A1 Aug. 9, 2007

(30) Foreign Application Priority Data

Feb. 9, 2006 (JP) ................................. 2006-032360

(51) Int. Cl.

| H04M 1/66 | (2006.01) |
|---|---|
| H04B 7/00 | (2006.01) |
| H04W 4/00 | (2009.01) |
| H04L 29/06 | (2006.01) |
| G06F 7/04 | (2006.01) |
| H04W 12/06 | (2009.01) |
| H04W 12/12 | (2009.01) |
| H04W 76/02 | (2009.01) |
| H04W 84/12 | (2009.01) |

(52) U.S. Cl.
CPC ............ *H04L 63/18* (2013.01); *H04L 63/0492* (2013.01); *H04L 63/08* (2013.01); *H04W 12/06* (2013.01); *H04W 12/12* (2013.01); *H04W 76/02* (2013.01); *H04W 84/12* (2013.01)

(58) Field of Classification Search
CPC ... H04W 12/06; H04L 63/08; H04L 12/2803; H04L 63/0428

USPC .................. 455/435.1, 435.2, 41.2, 410–411; 370/338; 713/156, 230, 25

See application file for complete search history.

(56) References Cited

U.S. PATENT DOCUMENTS

| 5,175,418 A | 12/1992 | Tanaka |
| 5,321,240 A * | 6/1994 | Takahira ....................... 235/380 |
| 6,068,193 A | 5/2000 | Kreft |

(Continued)

FOREIGN PATENT DOCUMENTS

| EP | 0957651 | 11/1999 |
| JP | 54073074 A * | 6/1979 |

(Continued)

*Primary Examiner* — Dung Hong
(74) *Attorney, Agent, or Firm* — Robert J. Depke; The Chicago Technology Law Group, LLC (57) ABSTRACT

A wireless connection system having at least one host device and at least one client device is disclosed. The client device is brought close to the host device, near field wireless communications are performed and an authentication process of authenticating the client device is performed with connection setting information through the near field wireless communications when wireless communications are performed between the host device and the client device based on a predetermined wireless communication standard. When the client device has been successfully authenticated with the connection setting information in the authentication process, the client device is permitted to perform the wireless communications. When the client device has not been successfully authenticated with the connection setting information in the authentication process, the client device is not permitted to perform the wireless communications.

3 Claims, 9 Drawing Sheets

(56) References Cited

U.S. PATENT DOCUMENTS

| | | |
|---|---|---|
| 7,042,852 B2 | 5/2006 | Hrastar |
| 7,127,210 B2 | 10/2006 | Aoyagi |
| 7,155,162 B2 | 12/2006 | Doi et al. |
| 7,245,213 B1 * | 7/2007 | Esterberg et al. ........ 340/539.12 |
| 7,325,246 B1 * | 1/2008 | Halasz et al. ..................... 726/2 |
| 7,359,674 B2 | 4/2008 | Markki et al. |
| 7,474,425 B2 | 1/2009 | Sasama |
| 2001/0023446 A1 | 9/2001 | Balogh |
| 2001/0025878 A1 | 10/2001 | Hendrick |
| 2002/0178277 A1 * | 11/2002 | Laksono ....................... 709/231 |
| 2003/0018889 A1 | 1/2003 | Burnett et al. |
| 2003/0054846 A1 | 3/2003 | Parry |
| 2003/0087629 A1 | 5/2003 | Juitt et al. |
| 2003/0092395 A1 | 5/2003 | Gassho et al. |
| 2003/0093663 A1 * | 5/2003 | Walker .......................... 713/150 |
| 2003/0149874 A1 * | 8/2003 | Balfanz et al. ................ 713/168 |
| 2003/0217289 A1 | 11/2003 | Ammon et al. |
| 2003/0224797 A1 | 12/2003 | Kuan et al. |
| 2003/0233567 A1 | 12/2003 | Lynn et al. |
| 2004/0008652 A1 | 1/2004 | Tanzella et al. |
| 2004/0031856 A1 | 2/2004 | Atsmon et al. |
| 2004/0083362 A1 | 4/2004 | Park et al. |
| 2004/0092231 A1 * | 5/2004 | Ayatsuka et al. ............. 455/41.2 |
| 2004/0111494 A1 | 6/2004 | Kostic et al. |
| 2004/0236860 A1 | 11/2004 | Logston et al. |
| 2004/0252837 A1 | 12/2004 | Harvey et al. |
| 2004/0253944 A1 | 12/2004 | Kelley |
| 2005/0071711 A1 | 3/2005 | Shaw |
| 2005/0097595 A1 * | 5/2005 | Lipsanen et al. ................. 725/25 |
| 2005/0160138 A1 * | 7/2005 | Ishidoshiro ................... 709/203 |
| 2005/0243129 A1 | 11/2005 | Kim |
| 2005/0286478 A1 * | 12/2005 | Mela et al. ..................... 370/338 |
| 2006/0068750 A1 * | 3/2006 | Burr .......................... 455/343.1 |
| 2007/0054616 A1 * | 3/2007 | Culbert ........................ 455/41.1 |

FOREIGN PATENT DOCUMENTS

| | | |
|---|---|---|
| JP | 02-280292 | 11/1990 |
| JP | 10-93508 | 4/1998 |
| JP | 11-232194 | 8/1999 |
| JP | 2001-086156 | 3/2001 |
| JP | 2001-111543 | 4/2001 |
| JP | 2001-156704 | 6/2001 |
| JP | 2001-189722 | 7/2001 |
| JP | 2002-124960 | 4/2002 |
| JP | 2002-204239 | 7/2002 |
| JP | 2002-351766 | 12/2002 |
| JP | 2002-359623 | 12/2002 |
| JP | 2003-152735 | 5/2003 |
| JP | 2003-229872 | 8/2003 |
| JP | 2004-032462 | 1/2004 |
| JP | 2004-364199 | 12/2004 |
| JP | 2005-167946 | 6/2005 |
| KR | 2005051210 A * | 6/2005 |
| WO | WO 2005104298 A1 * | 11/2005 |

* cited by examiner

WIRELESS CONNECTION SYSTEM AND WIRELESS CONNECTION METHOD

CROSS REFERENCES TO RELATED APPLICATIONS

The present invention contains subject matter related to Japanese Patent Application JP 2006-032360 filed in the Japanese Patent Office on Feb. 9, 2006, the entire contents of which being incorporated herein by reference.

BACKGROUND OF THE INVENTION

1. Field of the Invention

The present invention relates to a wireless connection system and a wireless connection method.

2. Description of the Related Art

As a method of wirelessly connecting a plurality of devices using radio waves, the IEEE (Institute of Electrical and Electronics Engineers) 802.11 standard and the Bluetooth (registered trademark) standard are known. The IEEE 802.11 standard is further categorized as the IEEE 802.11a, IEEE 802.11b, IEEE 802.11g, and other standards that differ in the transmission system and use frequency band. The IEEE 802.11b standard is for example used to wirelessly connect a plurality of personal computers to an access point device, namely structure a so-called wireless LAN (Local Area Network).

The communication distances of the IEEE 802 and Bluetooth standards are around several ten meters. In contrast, as a wireless communication means whose communication distance is shorter than such standards, a system using an RFID (Radio Frequency Identification) tag is known. An RFID tag is also called a wireless tag, a wireless IC tag, or the like. By reading data from an RFID tag attached to another electronic device corresponding to a request sent from a reader/writer, a communication is performed. This wireless communication uses a frequency of for example 125 kHz, 13.56 MHz, 433 MHz, a UHF band (800/900 MHz), 2.45 GHz, or 5.8 GHz.

As the wireless LAN has been widespread, it has become important to maintain the security of communications in the wireless LAN against illegal monitoring and data leakage. As a means of maintaining the security, for example an SSID (Service Set Identifier), a WEP (Wired Equivalent Privacy) key, or a MAC (Media Access Control) address is set so that an access from a terminal having a different WEP key or the like is restricted.

An invention of which a wireless connection is automatically set by bringing an IC card close to a personal computer, setting an SSID or a WEB key, and starting wireless communications is described in Japanese Patent Application Laid-Open No. 2003-229872.

SUMMARY OF THE INVENTION

However, in the foregoing method, if an SSID or a WEP key is obtained by an illegal means and the SSID or the WEP key is set, when the SSID or the WEP key is correct, wireless communications are permitted. Instead, if a person retired from a company uses an SSID or a WEP key that he or she obtained when he or she worked there, he or she can hack into the company's LAN system. Thus, they are not desirable from a point of view of security.

Although an illegal hacking into the LAN system can be prevented with a password or the like, if the password is obtained by an illegal means, the similar problem may occur. In the method of performing an authentication process with an SSID, a WEP key, a password, or the like, it is necessary to carefully control them. If an SSID, a WEP key, or a password is leaked out and used, illegal hacking into the LAN system is not able to be prevented.

In recent years, home LAN systems that structure LAN systems in homes have been widespread. Wireless LAN systems used in companies are carefully controlled to prevent data from being leaked out. However, home LAN systems are not properly controlled in contrast to their convenience. In addition, not all home LAN users have knowledge about the wireless LAN. Thus, they may keep their security at a distance due to complicated settings. Thus, it is desired to provide a simple method of preventing a home LAN system from being illegally hacked.

In view of the foregoing, it would be desirable to provide a wireless connection system and a wireless connection method of performing an authentication process whenever wireless communications are started to improve the security of a LAN system and of preventing it from being illegally hacked, data from being leaked out, and the LAN system from being illegally used.

According to an embodiment of the present invention, there is provided a wireless connection system having at least one host device and at least one client device. The client device is brought close to the host device, near field wireless communications are performed, and an authentication process of authenticating the client device is performed with connection setting information through the near field wireless communications when wireless communications are performed between the host device and the client device based on a predetermined wireless communication standard. When the client device has been successfully authenticated with the connection setting information in the authentication process, the client device is permitted to perform the wireless communications. When the client device has not been successfully authenticated with the connection setting information in the authentication process, the client device is not permitted to perform the wireless communications.

According to an embodiment of the present invention, there is provided a wireless communication method performed by at least one host device and at least one client device. The client device is brought close to the host device and performing near field wireless communications therebetween when the host device and the client device perform wireless communications based on a predetermined wireless communication standard. The client device is authenticated with connection setting information through the near field wireless communications. When the client device has been successfully authenticated with the connection setting information at the authentication step, the client device is permitted to perform the wireless communications. When the client device has not been successfully authenticated with the connection setting information at the authentication step, the client device is not permitted to perform the wireless communications.

According to an embodiment of the present invention, there is provided a wireless connection system having at least two portable devices. A first portable device is brought close to a second portable device, near field wireless communications are performed, and an authentication process of authenticating the first portable device is performed with connection setting information through the near field wireless communications when wireless communications are performed between the first portable device and the second portable device based on a predetermined wireless communication standard. When the first portable device has been successfully authenticated with the connection setting information in the authentication process, the first portable device is permitted to perform the wireless communications. When the first portable device has not been successfully authenticated with the connection setting information in the authentication process, the first portable device is not permitted to perform the wireless communications.

According to an embodiment of the present invention, there is provided a wireless communication method performed by at least two portable devices. A first portable device is brought close to a second portable device and performing near field wireless communications therebetween when the first portable device and the second portable device perform wireless communications based on a predetermined wireless communication standard. The first portable device is authenticated with connection setting information through the near field wireless communications. When the first portable device has been successfully authenticated with the connection setting information at the authentication step, the first portable device is permitted to perform the wireless communications. When the first portable device has not been successfully authenticated with the connection setting information at the authentication step, the first portable device is not permitted to perform the wireless communications.

According to an embodiment of the present invention, an authentication process can be highly secured. A third party can be prevented from illegally hacking into a network composed of for example a wireless LAN. In addition, according to an embodiment of the present invention, the security of communications in a wireless LAN can be highly secured without necessity of using a complicated encryption technique or the like.

In addition, according to an embodiment of the present invention, when a portable device is provided with a reader/writer function, data can be transmitted and received between devices using near field wireless communications.

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENTS

Figure 1:
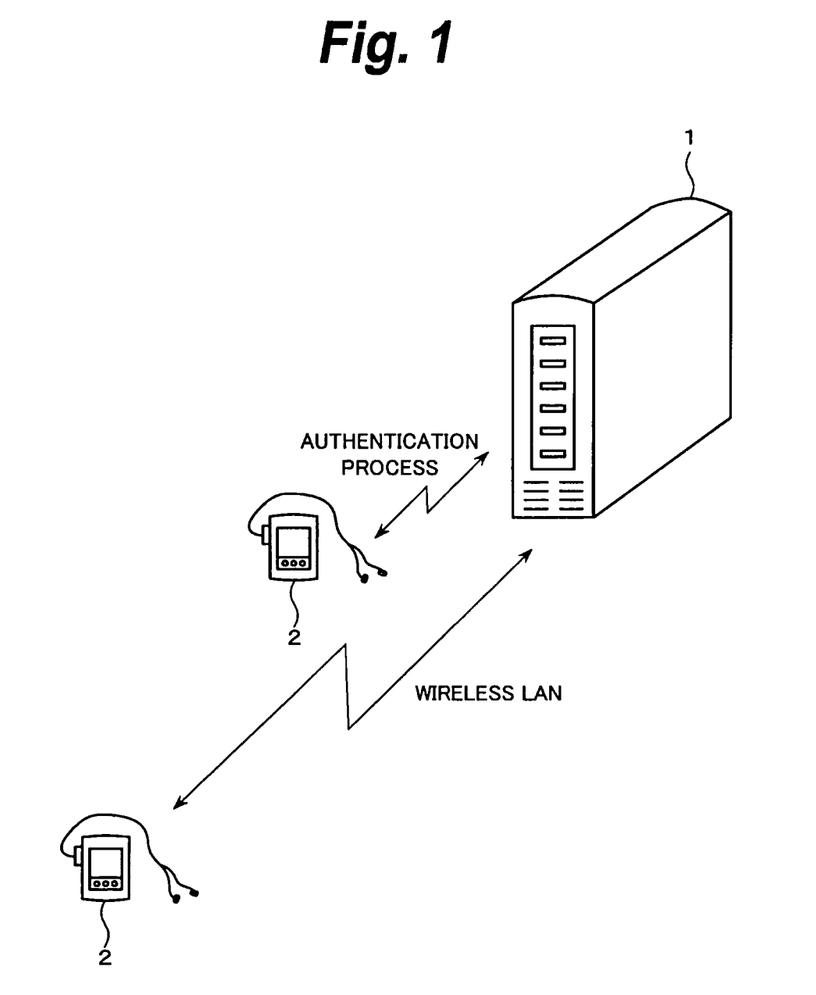
FIG. 1 is a schematic diagram showing an outline of a wireless connection system according to a first embodiment of the present invention.

Next, with reference to the accompanying drawings, a first embodiment of the present invention will be described. FIG. 1 schematically shows a wireless connection system for a home LAN system according to the first embodiment of the present invention. In the wireless connection system according to the first embodiment, wirelessly connected to a home server 1 that is an example of a host device are client devices 2 that are various types of electronic devices and they communicate each other. The client devices 2 are multi-media devices for example a PDA (Personal Digital Assistance), a digital still camera, a camcorder (abbreviation of camera and recorder), a portable audio device, a laptop type personal computer, a PC (Personal Computer) card, a USB (Universal Serial Bus) stick, and a USB dongle.

Of course, the home server 1 stores document files. In addition, the home server 1 stores picture content, such as video pictures and recorded television programs, and audio content, such as music. In addition, the home server 1 can have tuner functions of television broadcasts and radio broadcasts and a cash function for WWW (World Wide Web) pages. When the client device 2 is wirelessly connected to the home server 1 and they communicate each other, the client device 2 can use various types of content stored in the home server 1.

For example, if the client device 2 is a portable audio device, when the client device 2 is wirelessly connected to the home server 1, with the client device 2, audio content can be downloaded from the home server 1 and the downloaded audio content can be heard everywhere in the house. On the other hand, if the client device 2 is a PDA, with the client device 2, picture content stored in the home server 1 and received television broadcasts can be watched everywhere in the house. If the client device 2 is a digital camera, when photographed picture data have been stored in the home server 1, with the client device 2, every family member can watch the picture data everywhere in the home. In FIG. 1, it is assumed that only one home server is disposed. Instead, a plurality of home servers 1 may be disposed.

In addition, the home server 1 and the client device 2 can perform near field wireless communications. The near field wireless communications are communications performed by bringing the client device 2 close to the home server 1. The communication range of the near field wireless communications is one meter or less. One meter from the home server 1 is normally in the house. Thus, the near field wireless communications are not able to be preformed for the home server 1 for example from the outside of the house.

The near field wireless communications are performed for example with an RFID tag. The home server 1 functions as a reader/writer. The home server 1 communicates with the client device 2 that has an RFID tag through a radio wave.

Figure 2:
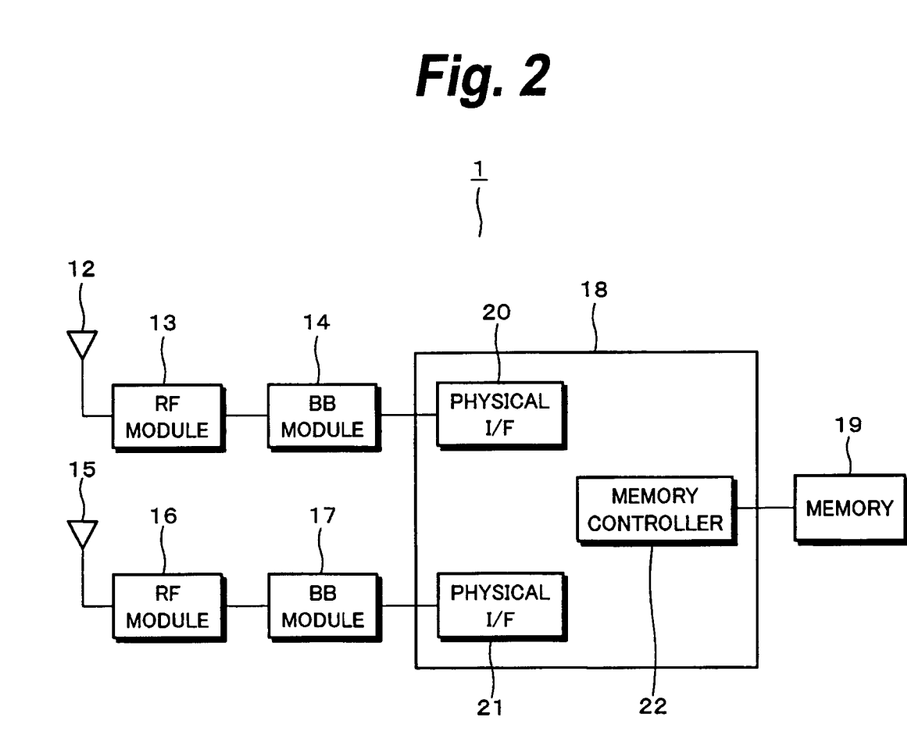
FIG. 2 is a block diagram showing a structure of an example of a communication section of a home server according to the first embodiment of the present invention.

FIG. 2 shows a structure of a communication section of the home server 1. The communication section of the home server 1 includes an antenna 12, an RF (Radio Frequency) module 13, and a BB (Base Band) module 14 for a system that is wirelessly connected to the client device 2 and data are transmitted and received therebetween, and an antenna 15, an RF module 16, and a BB module for a system that performs near field wireless communications with the client device 2. The home server 1 also includes a MAC module 18 and a memory 19. The MAC module 18 includes a physical interface (I/F) 20, a physical I/F 21, and a memory controller 22. Although the home server 1 also includes a storage means such as a hard disk drive in addition to the communication section, since the storage means does not relate to this embodiment of the present invention, its description will be omitted.

Figure 3:
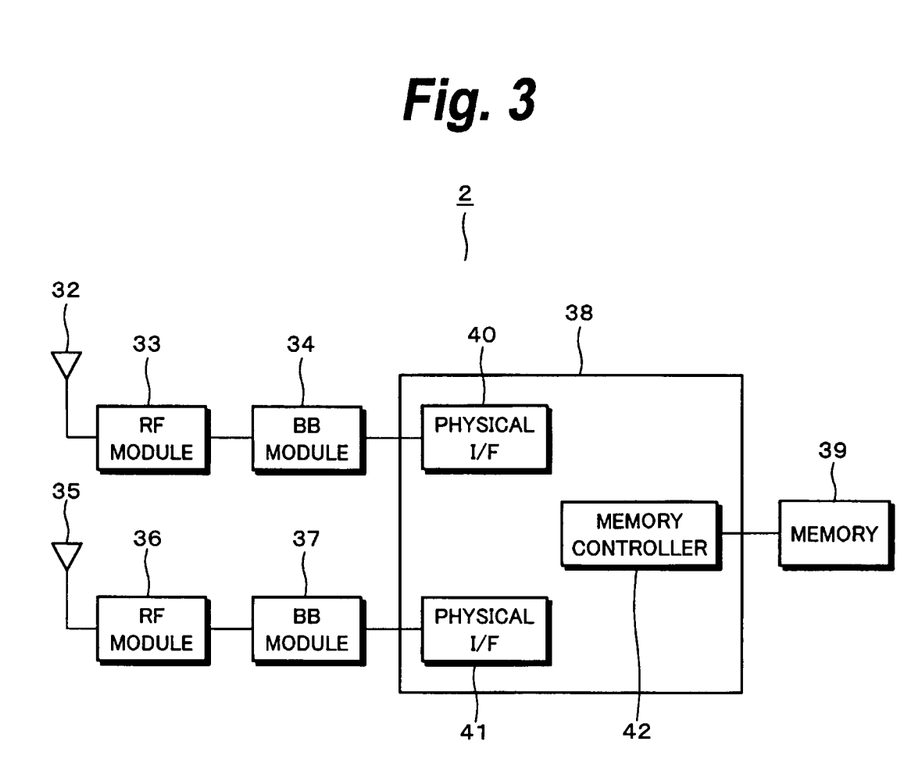
FIG. 3 is a block diagram showing a structure of an example of a communication section of a client device according to the first embodiment of the present invention.

FIG. 3 shows a structure of a communication section of the client device 2. The structure of the communication section of the client device 2 is nearly the same as that of the home server 1. The communication section of the client device 2 includes an antenna 32, an RF module 33, and a BB module for a system that is wirelessly connected to the home server 1 and data are transmitted and received therebetween, an antenna 35, an RF module 36, and a BB module for a system that performs the near field wireless communications with the home server 1. The communication section of the client device 2 also includes a MAC module 38 and a memory 39. The MAC module 38 includes a physical I/F 40, a physical I/F 41, and a memory controller 42. The client device 2 also has anther structure that depends on the type of the client device 2.

Figure 4:
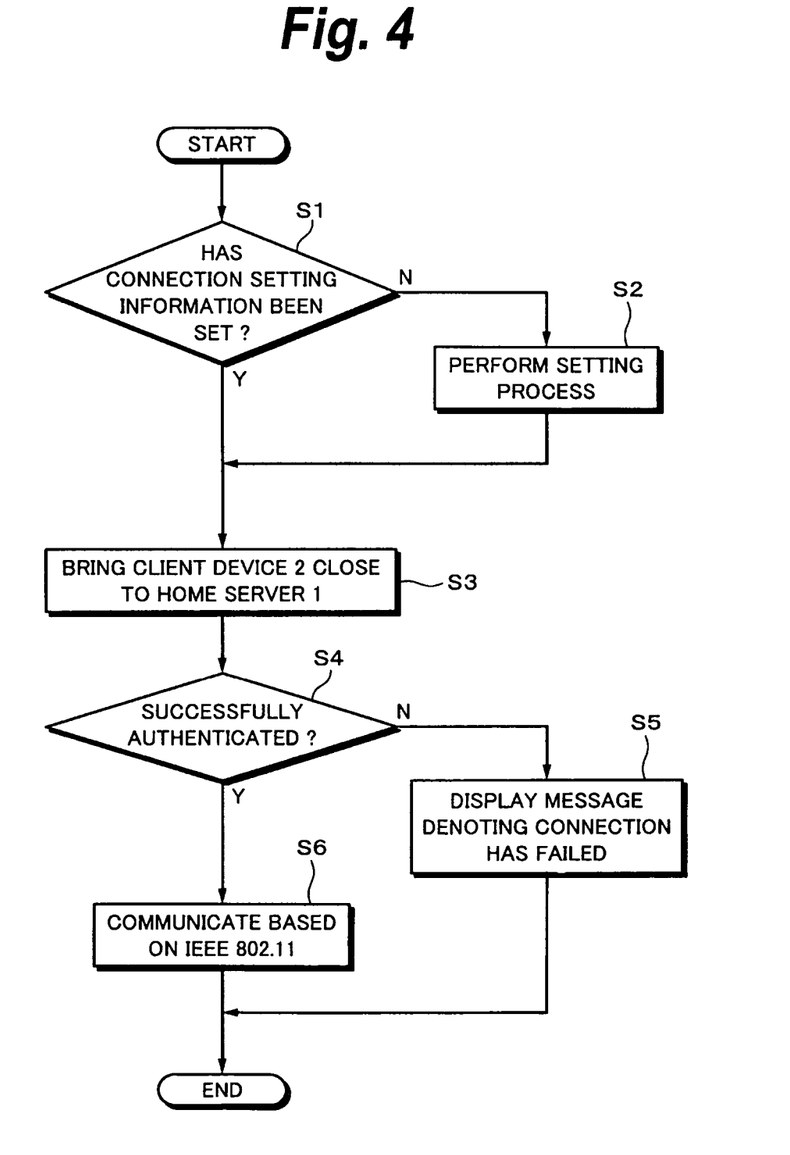
FIG. 4 is a flow chart showing a procedure of a wireless connection according to the first embodiment of the present invention.

FIG. 4 is a flow chart showing a procedure of a communication process according to the first embodiment of the present invention. At step S1, it is determined whether or not for example an SSID or a WEP key has been set. When the determined result denotes that an SSID or a WEP key has not been set, the flow advances to step S2.

At step S2, a setting process is performed. The setting process is performed through the near field wireless communications using for example an RFID tag. Connection setting information such as SSID or a WEP key has been registered in the memory 19 of the home server 1. When an SSID or a WEP key is set, connection setting information is read from the memory 19 of the home server 1 and supplied to the BB module 17 through the physical I/F 21. The BB module 17 modulates data containing the connection setting information and the modulated data are transmitted as a radio wave from the antenna 15 through the RF module 16. The data are modulated according to for example an amplification modulation system (ASK (Amplitude Shift Keying)), a frequency modulation system (FSK (Frequency Shift Keying)), or a phase modulation system (PSK (Phase Shift keying)).

When an SSID or a WEP key is set, the client device 2 is brought close to the home server 1. When the client device 2 is brought close to the home server 1, the client device 2 can receive a radio wave from the home server 1. A radio wave transmitted from the antenna 15 of the home server 1 is received by the antenna 35 of the client device 2. The RF module 36 performs a demodulation process for the received radio wave and supplies the resultant demodulated data as connection setting information to the MAC module 38 through the BB module 37. The memory controller 42 of the MAC module 38 converts the connection setting information into a predetermined format. The resultant information is stored in the memory 39. Here, the setting process is completed.

The home server 1 and the client device 2 may be formed as a device family such that connection setting information has been stored in the memory 39 of the client device 2 in advance. When the connection setting information has been stored in advance, the procedure of step S1 and step S2 can be omitted.

In the related art, after connection setting information has been set, when the client device 2 and the home server 1 are connected next time, an authentication process of determining whether or not the connection setting information is proper is automatically performed. Thus, if a third party who has not been permitted to connect his or her client device 2 to the home server 1 obtains connection setting information, he or she can illegally hack into the home server 1 using the illegally obtained connection setting information.

To solve such a problem, according to this embodiment of the present invention, when a client device for which the setting process has been performed is connected to a host device such as a home server, the host device performs the authentication process for the client device. Only when the host device has successfully authenticated client device, it can wirelessly communicate with the host device. In addition, since a LAN system composed of a wireless LAN is disposed in a physically limited space, the authentication process is performed through the near field wireless communications that only a person who is present in the space can perform.

Returning to the flow chart shown in FIG. 4, at step S3, the client device 2 for which the connection setting information has been set is brought close to the home server 1. The home server 1 performs the authentication process for the client device 2.

The authentication process is performed through the near field wireless communication using an RFID tag. When the client device 2 is brought close to the home server 1, the antenna 35 of the client device 2 can receive a weak radio wave transmitted from the antenna 15 of the home server 1.

The radio wave received by the antenna 35 of the client device 2 induces an electromotive force in the RFID tag. The RF module 36 of the client device 2 performs a demodulation process for the received radio wave. The BB module 37 performs a base band signal process for the demodulated signal and supplies a base band signal to the MAC module 38. The connection setting information is read from the memory 39 and supplied to the BB module 37 through the physical I/F 41. The BB module 37 performs a base band signal process for the connection setting information. The RF module 36 performs a modulation process for the base band signal and transmits the modulated signal as a radio wave from the antenna 35.

The radio wave transmitted from the antenna 35 is received by the antenna 15 of the home server 1. The RF module 16 performs a demodulation process for the received radio wave. The BB module 17 performs a base band signal process for the demodulated signal and supplies a base band signal to the MAC module 18. The home server 1 compares the connection setting information obtained from the radio wave transmitted from the client device 2 with the connection setting information stored in the memory 19. When they match, the home server 1 successfully authenticates the client device 2. When they do not match, the home server 1 does not successfully authenticate the client device 2.

When the home server 1 has not successfully authenticated the client device 2, the flow advances to step S5. At step S5, a monitor of the home server 1 or the client device 2 displays a message that denotes that the connection has failed. Instead, an alarm that denotes that the connection has failed may be generated.

When the home server 1 has successfully authenticated the client device 2, the flow advances to step S6. At step S6, since the home server 1 has successfully authenticated the client device 2, wireless connections are performed between the home server 1 and the client device 2 and they communicates each other based on to for example the IEEE 802.11 standard. At this point, the home server 1 and the client device 2 communicate using the antenna 12, the RF module 13, and the BB module of the home server 1 and the antenna 32, the RF module 33, and the BB module 34 of the client device 2.

When the operation of the client device 2 is completed and the power thereof is turned off, communications between the client device 2 and the home server 1 are completed and the wireless connection is broken. When the client device 2 and the home server 1 are communicated again, the procedure is repeated after step S3.

Figure 5:
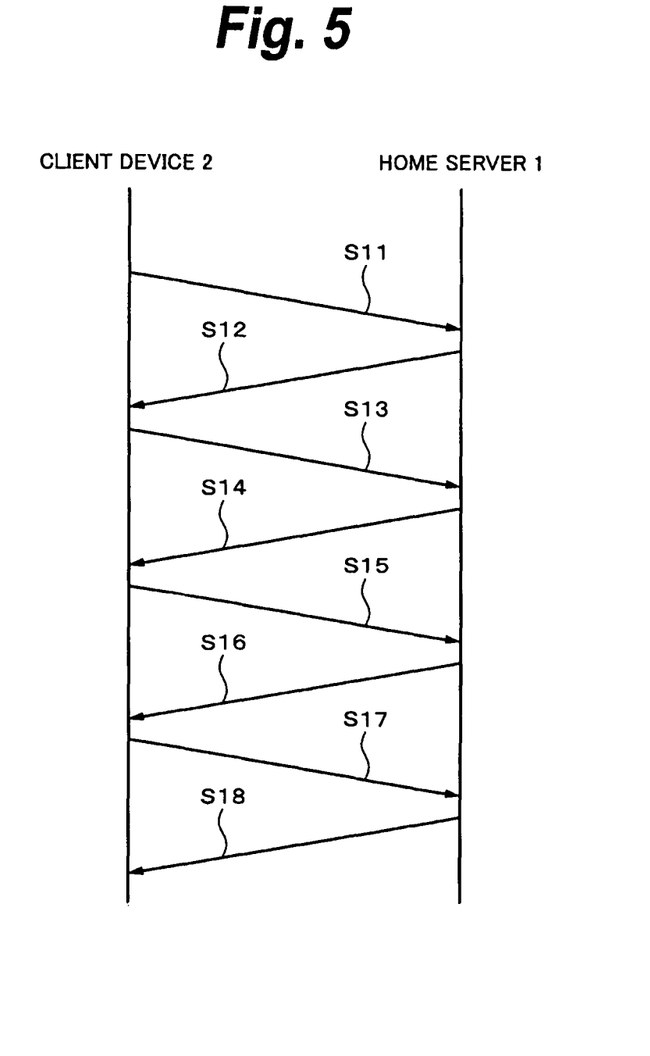
FIG. 5 is a flow chart showing a procedure of an authentication process according to the first embodiment of the present invention.

FIG. 5 is a flow chart showing an example of the procedure of the authentication process performed between the home server 1 and the client device 2. At step S11, the client device 2 sends a probe request to the home server 1. At step S12, the home server 1 sends a probe response to the client device 2 corresponding to the probe request.

Thereafter, at step S13, the client device 2 sends an authentication request to the home server 1. At step S14, the home server 1 sends an SSID authentication request to the client device 2 corresponding to the authentication request.

At step S15, the client device 2 sends an SSID as the authentication response to the home server 1 corresponding to the SSID authentication request. When the home server 1 has successfully authenticated the client device 2 with the SSID, the flow advances to step S16. At step S16, the home server 1 sends to the client device 2 an authentication response that denotes that the home server 1 has successfully authenticated the client device 2.

Since the authentication process has been successfully performed, wireless connections are performed between the home server 1 and the client device 2 and they communicate each other. In other words, at step S17, the client device 2 sends an association request to the home server 1. At step S18, the home server 1 sends an association response to the client device 2 corresponding to the association request.

Figure 6:
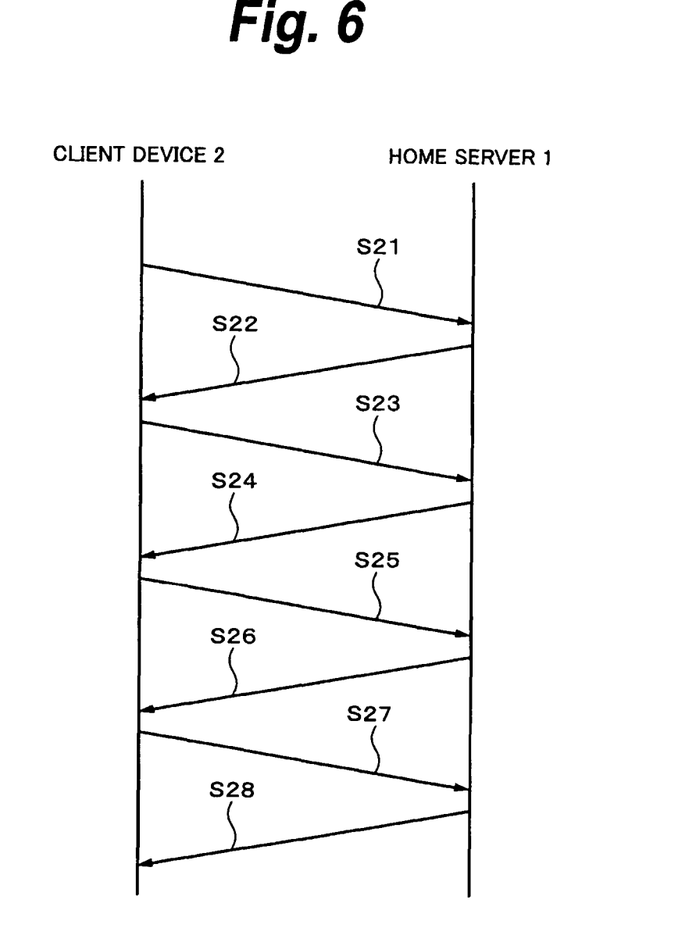
FIG. 6 is a flow chart showing a procedure of another example of the authentication process according to the first embodiment of the present invention.

FIG. 6 is a flow chart showing another example of the procedure of the authentication process. FIG. 6 shows an example of the procedure of the authentication process using a WEP key. At step S21 to step S23, a probe request, a probe response, and an authentication request are sent in the same manner as the foregoing example.

Thereafter, at step S24, the home server 1 sends a WEP key encryption request to the client device 2. At step S25, the client device 2 sends a WEP key encryption response to the home server 1 corresponding to the encryption request.

When the home server 1 has successfully authenticated the client device 2, the flow advances to step S26. At step S26, the home server 1 sends to the client device 2 an authentication response that denotes that the home server 1 has successfully authenticated the client device 2. Thereafter, communications are started between the home server 1 and the client device 2. At step S27, the client device 2 sends an association request to the home server 1. At step S28, the home server 1 sends an association response to the client device 2 corresponding to the association request.

Whenever the client device 2 is wirelessly connected to the home server 1, since it performs the authentication process for the client device 2 through the near field wireless communications, security level of the authentication process can be remarkably improved. In other words, since the communication range of the near field wireless communications using an RFID tag is one meter or less, for example around 10 cm, a third party who is not present in this range is not capable of performing the authentication process. For example, in the example of the home LAN system according to the foregoing first embodiment, since one meter from the home server 1 is in the house, the third party who has not been permitted to access the home server 1 is not capable of performing the authentication process. Thus, the third party is not capable of hacking into the wireless LAN network.

Likewise, in a company's LAN system, when a host device (for example, an access point) is disposed at a location that a third party is not capable of accessing the LAN system and the host device performs the authentication process for a client device, even if a retired person knows connection setting information, he or she can be prevented from hacking into the LAN system.

In addition, as described above, since the wireless connection system according to this embodiment of the present invention does not use a complicated encryption technique, the structures of devices do not become complicated. When the authentication process is performed for a client device, it is necessary to bring the client device close to the host device. However, once the client device has been successfully authenticated, it can continuously access the host device until the communications are broken. Thus, no excessive load is imposed on the user.

Next, a second embodiment of the present invention will be described. In the first embodiment of the present invention, a reader/writer that performs the near field wireless communications is disposed in a host device, such as a home server, and a near field wireless communication tag, such as an RFID tag, is disposed in a small client device such as a PDA. With the reader/writer and the tag, the host device authenticates the client device. After the host device has successfully authenticated the client device, data are transmitted and received therebetween through wireless communications. Thus, to transmit and receive data among portable devices that are a plurality of client devices, it is necessary for the host device to authenticate the portable devices and transmit and receive data among the portable devices through the host device.

In related art, wireless communications and near field wireless communications are controlled by a CPU (Central Processing Unit) that controls the overall portable device. Thus, the load is excessively imposed on the CPU of the portable device.

Thus, in the second embodiment of the present invention, a reader/writer function and a tag are disposed in each portable device such that portable devices can authenticate each other and directly transmit and receive data therebetween without an intervention of a host device.

In addition, a CPU disposed in a wireless communication module controls a wireless communication and near field wireless communications and a CPU disposed in a portable device controls the CPU disposed in the wireless communication module such that the load imposed on the CPU of the portable device is reduced.

Figure 7:
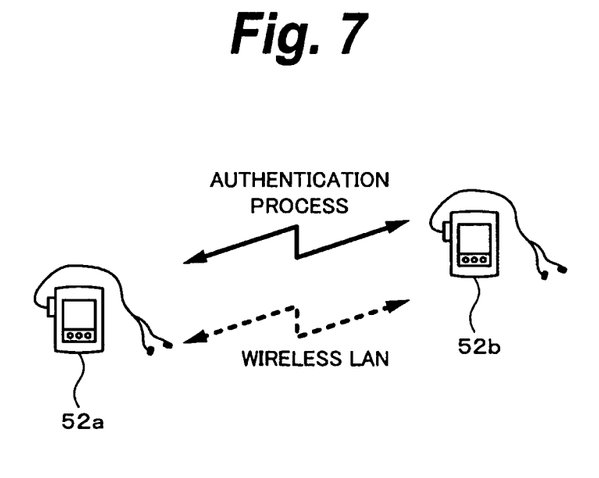
FIG. 7 is a schematic diagram showing a structure of an example of a wireless connection system according to a second embodiment of the present invention.

Next, with reference to FIG. 7, a structure of an example of a wireless connection system according to the second embodiment of the present invention will be described. In the wireless connection system according to the second embodiment, wireless communications and near field wireless communications can be performed by a plurality of portable devices 52a and 52b. First, the portable devices 52a and 52b authenticate each other through near field wireless communications. Thereafter, the portable devices 52a and 52b transmit and receive data therebetween through wireless communications.

Like the client device 2 of the first embodiment of the present invention, the portable devices 52a and 52b are multimedia devices such as a PDA, a portable audio device, a laptop type personal computer, and a PC card. The portable devices 52a and 52b can store picture content and audio content. In addition, the portable devices 52a and 52b can have tuner functions for television broadcasts and radio broadcasts and a cash function for WWW pages in addition to a storage function for content. Moreover, when the portable devices 52a and 52b wirelessly communicate with another portable device, the portable devices 52a and 52b can transmit and receive various types of stored content to and from the other portable device.

Near field wireless communications are performed with for example RFID tags. The portable devices 52a and 52b each have a reader/writer and an RFID tag. When the portable devices 52a and 52b perform near field wireless communications, one portable device functions as a reader/writer and communicates with the other portable device. In the following description, it is assumed that the portable device 52a functions as a reader/writer and communicates with the portable device 52b. In addition, it is assumed that as wireless communications and near field wireless communications, a wireless LAN and an RFID are used, respectively, and that the frequency of RFID is 13.56 MHz.

Figure 8:
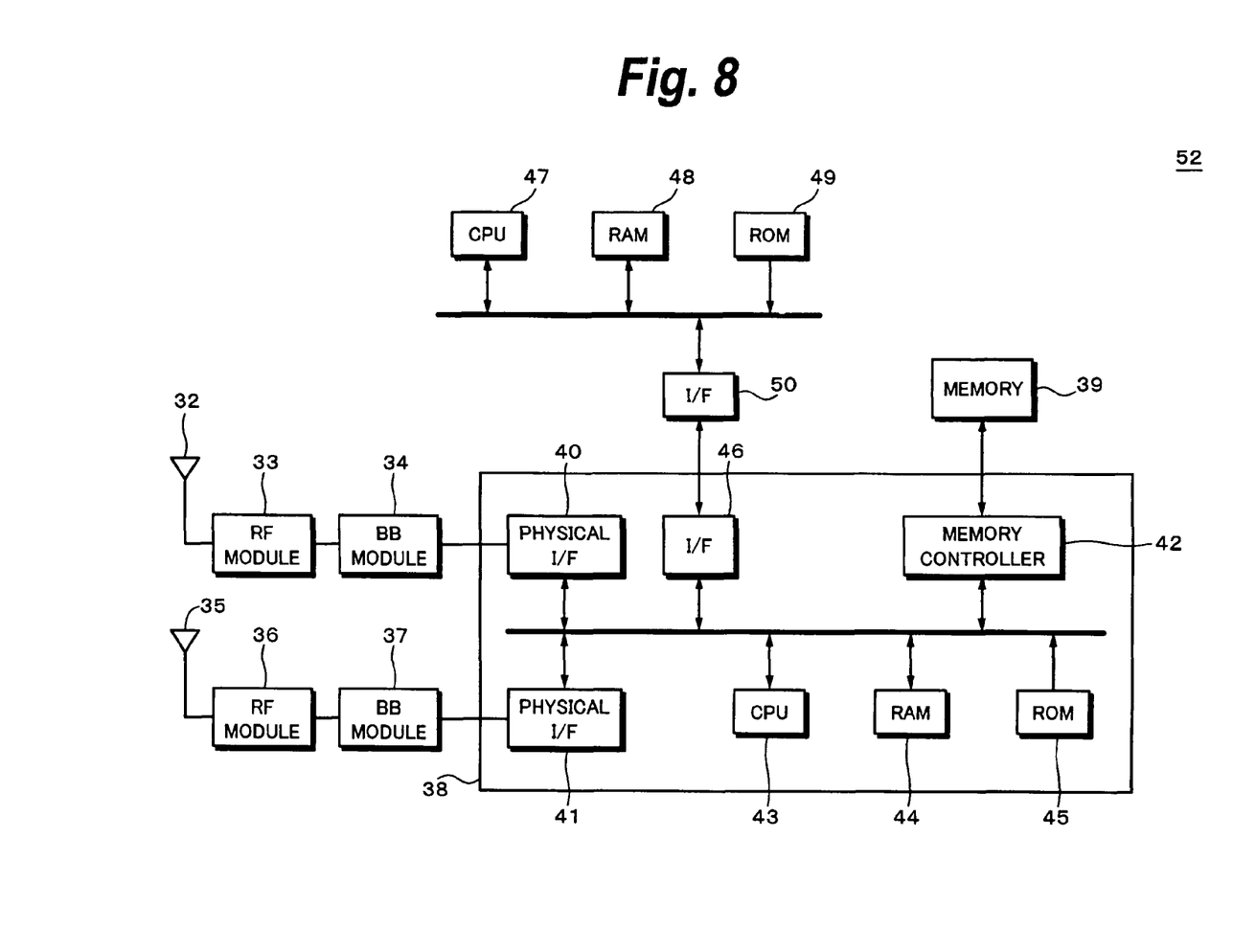
FIG. 8 is a schematic diagram showing a structure of an example of a portable device according to the second embodiment of the present invention.

FIG. 8 shows a structure of an example of each of the portable devices 52a and 52b according to the second embodiment of the present invention. Each of the portable devices 52a and 52b (when it is not necessary to identify them, they are simply referred to as the portable device 52) is a device that is the same as the client device 2 of the first embodiment except that the reader/writer function is added. Thus, in FIG. 8, similar portions of the communication section to those in FIG. 3 will be denoted by similar reference numerals and their description will be omitted. In addition, description of sections in the portable device 52 that do not relate to this embodiment of the present invention, for example an operation section and a display section will be omitted.

The portable device 52 mainly includes an antenna 32, an RF module 33, a BB module 34, an antenna 35, an RF module 36, a BB module 37, a MAC module 38, a memory 39, a CPU 47, and an I/F 50. The MAC module 38 mainly includes a physical I/F 40, a physical I/F 41, a memory controller 42, a CPU 43, and an I/F 46. Since the antenna 32, the RF module 33, the BB module 34, the antenna 35, the RF module 36, the BB module 37, the memory 39, the physical I/F 40, the physical I/F 41, and the memory controller 42 are the same as those shown in FIG. 3, their description will be omitted.

The CPU 47 uses a RAM (Random Access Memory) 48 as a work memory and controls each section of the portable device 52 according to a program stored in a ROM (Read Only Memory) 49. The I/F 50 receives data from the I/F 46 and outputs the data to the CPU 47 and supplies a command received from the CPU 47 to the CPU 43 through the I/F 46.

The CPU 43 uses a RAM 44 as a work memory and controls each section of the MAC module 38 according to a program stored in a ROM 45. In addition, the CPU 43 executes various types of processes for wireless communications and near field wireless communications according to commands received from the CPU 47. The CPU 43 for example performs the authentication process for data received from the portable device 52 and generates commands transmitted to the portable device 52.

The I/F 46 supplies data obtained through wireless communications or near field wireless communications to the CPU 47 through the I/F 50 and outputs commands received from the CPU 47 to the CPU 43 through the I/F 50.

Next, a procedure of a communication process according to the second embodiment of the present invention will be described. Since the procedure of the communication process according to the second embodiment is the same as that shown in FIG. 4, its detail description will be omitted.

First of all, one of the portable devices 52a and 52b is brought close to the other and near field wireless communications are performed therebetween. An SSID, a WEP key, or the like is set to the reception side portable device 52b. Connection setting information such as an SSID, a WEP key, or the like has been set to the transmission side portable device 52a in advance. When connection setting information is set, it is read from the memory 39 (hereinafter referred to as the memory 39a) of the portable device 52a. The connection setting information is modulated according to a predetermined modulation system, for example ASK modulation system, and the modulated data are transmitted as a radio wave from the antenna 35 (hereinafter, referred to as the antenna 35a) of the portable device 52a.

The data are transmitted to the portable device 52b, which has the RFID tag. In addition, a power that drives the RFID tag is supplied to the portable device 52b. When the frequency of RFID is 13.56 MHz, the power is electromagnetically inducted (this system is referred to as the electromagnetic induction system) and supplied to the portable device 52b.

In the electromagnetic induction system, a current flows in a coil-shaped antenna 35a of the portable device 52a, causing a magnetic field to be vertically generated in the antenna 35a. When the antenna 35 (hereinafter referred to as the antenna 35b) of the portable device 52b is exposed to the magnetic field, an electromotive force occurs in the antenna 35b, causing a current to flow therein.

In addition, an electromagnetic wave transmitted from the portable device 52a has been superimposed with data modulated according to the ASK modulation system. The portable device 52b is driven by a current inducted by the magnetic field generated by the portable device 52a. The portable device 52b obtains data from the electromagnetic wave that is output from the portable device 52a.

The portable device 52b receives data from the portable device 52a, demodulates the data, and obtains connection setting information from the demodulated data. The obtained connection setting information is stored in the memory 39 (hereinafter referred to as the memory 39b) of the portable device 52b. Here, the setting process is completed.

Instead of the foregoing setting method, the connection setting information may have been stored in the memory 39 of the portable device 52b in advance.

Thereafter, the portable device 52b is brought close to the portable device 52a and an authentication process of determining whether or not connection setting information is proper is performed. When the portable device 52b is brought close to the portable device 52a, an electromotive force occurs in the RFID tag of the portable device 52b. This electromotive force drives the RFID tag of the portable device 52b, resulting in reading connection setting information from the memory 39b. The connection setting information that has been read is modulated according to the predetermined modulation system and the modulated information is transmitted as a radio wave from the antenna 35b.

The data that have been transmitted from the portable device 52b are received by the antenna 35a of the portable device 52a. The portable device 52a performs the demodulation process for the received data and compares the demodulated connection setting information with connection setting information stored in the memory 39a. When they match, the portable devices 52a and 52b are successfully authenticated. When they do not match, the portable devices 52a and 52b are not successfully authenticated.

In the authentication process, for example an WEP key is used. Since the procedure of the authentication process is the same as that shown in FIG. 6, its detail description will be omitted. The portable device 52b sends a probe request to the portable device 52a. The portable device 52a sends a probe response to the portable device 52b corresponding to the probe request. Thereafter, the portable device 52b sends an authentication request to the portable device 52a.

Thereafter, the portable device 52a sends a WEP key encryption request to the portable device 52b. The portable device 52b sends a WEP key encryption response to the portable device 52a corresponding to the encryption request.

After the portable device 52a has successfully authenticated the portable device 52b, the portable device 52a sends an authentication response representing success of the authentication to the portable device 52b. Thereafter, the portable device 52a and the portable device 52b start communicating each other. Thereafter, the portable device 52b sends an association request to the portable device 52a. The portable device 52a sends an association response to the portable device 52b corresponding to the association request.

When the portable device 52a has successfully authenticated the portable device 52b, near field wireless communications are switched to wireless communications according to a command sent from the CPU 47 under the control of the CPU 43 and data are transmitted and received between the portable device 52a and the portable device 52b.

Thus, when a reader/writer and an RFID tag are disposed in each of the portable devices 52a and 52b, data can be directly exchanged therebetween.

When the CPU 43 controls wireless communications and near field wireless communications according to commands sent from the CPU 47, which controls the entire portable device 52, the load imposed on the CPU 47 can be reduced.

In this example, the portable device 52a operates as a reader/writer and communicates with the portable device 52b. This embodiment is not limited to such an example. Instead, the portable device 52b may operates as a reader/writer and communicate with the portable device 52a.

In the second embodiment of the present invention, the case of which the two portable devices 52a and 52b are used is described. Instead, this embodiment can be also applied to the case of which a communication process is performed with three or more portable devices.

Next, the shape of the portable device 52 according to the second embodiment will be described. When the frequency of RFID used for near field wireless communications is 13.56 MHz, as described above, since the electromagnetic induction system is used, the antenna for RFID is formed in a coil shape. In the case of the portable device 52 of related art, which mounts a wireless LAN system and RFID, an antenna and a tag chip for RFID are disposed in a space different from a space for a wireless LAN module. Thus, the portable device 52 of related art necessitates a space for the wireless LAN module and a space for the antenna for RFID. Thus, it is difficult for the portable device 52 of related art to reduce the size.

To solve such a problem, in the second embodiment of the present invention, a wireless communication module and a near field wireless communication module are disposed in an area surrounded by a coil-shaped antenna such that the space of the portable device 52 can be effectively used.

Figure 9:
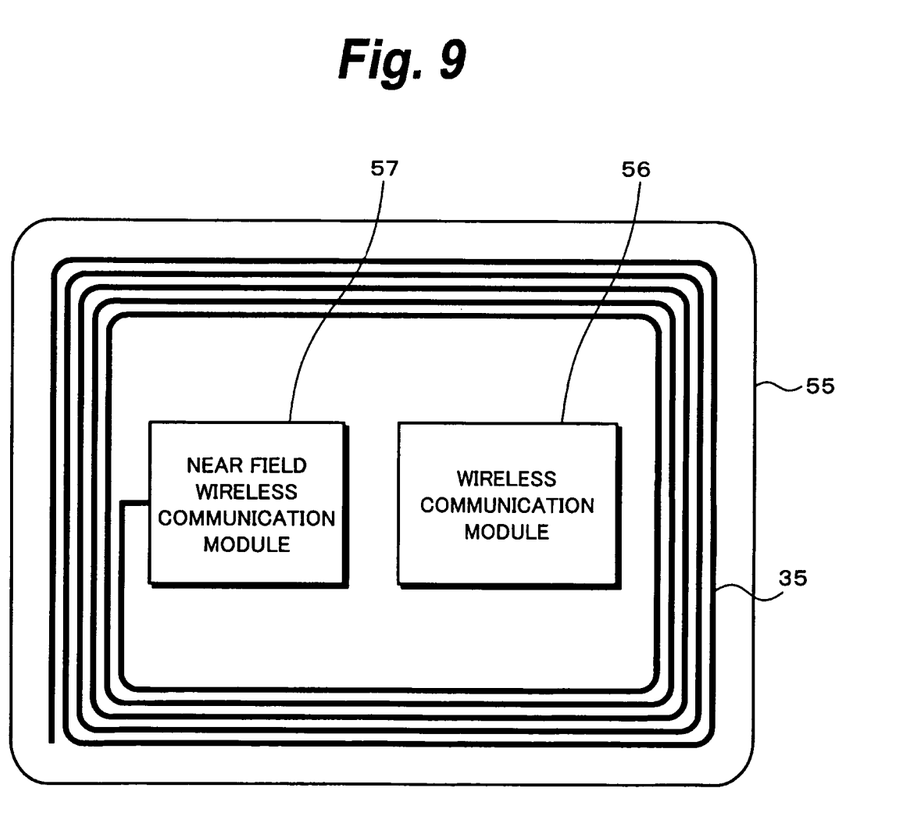
FIG. 9 is a schematic diagram showing an example of an arrangement of communication modules according to the second embodiment of the present invention.

FIG. 9 shows an example of the arrangement of a communication module 55 according to the second embodiment of the present invention. The communication module 55 mainly includes a wireless communication module 56 and a near field wireless communication module 57. The wireless communication module 56 mainly includes an antenna 35, an RF module 33, and a BB module 34. The near field wireless communication module 57 mainly includes an RF module 36 and a BB module 37.

When the frequency of RFID is 13.56 MHz, the antenna 35 is formed in a coil shape having a predetermined pattern. At this point, the dimensions of the antenna 35 are for example around 30 mm×40 mm. The wireless communication module 56 and the near field wireless communication module 57 are disposed in an area surrounded by the antenna 35. The near field wireless communication module 57 and the antenna 35 are connected.

When the wireless communication module 56 and the near field wireless communication module 57 are disposed in the area surrounded by the antenna 35, the internal space of the portable device 52 can be effectively used and the size of the portable device 52 can be reduced.

As described in the second embodiment of the present invention, when the portable device 52 is provided with the reader/writer function, in addition to transmission and reception of data among a plurality of portable devices, the portable device 52 can be used in various applications. When a portable device having a reader/writer function is brought close to a poster in which an RFID tag is buried, data recorded in the RFID tag of the poster, for example information with respect to illustration and/or text of the poster, can be obtained and/or an Internet site with respect to that can be browsed. When a portable device is provided with the reader/writer function, data can be exchanged with another device having the RFID tag.

The first embodiment and the second embodiment of the present invention have been specifically described. However, it should be understood by those skilled in the art that various modifications, combinations, sub-combinations and alternations may occur depending on design requirements and other factors insofar as they are within the scope of the appended claims or the equivalents thereof. The connection setting information may be a user ID or a password instead of an SSID or a WEP key. In addition, WPA (Wireless Protected Access) function or PKI (Public Key Infrastructure) may be used.

In the first embodiment, a wireless connection using a wireless LAN based on the IEEE 802.11 standard was described. Of course, the first embodiment may be applied to a wireless connection based on another standard. For example, the wireless connection system according to an embodiment of the present invention can be applied to wireless connections based on PAN (Personal Area Network) including Bluetooth and UWB (Ultra Wide Band). As near field wireless communications using an RFID tag, a radio wave system using radio waves or an electromagnetic induction system was used. Instead, another system such as electromagnetic coupling system may be used.

What is claimed is:

1. A wireless connection system having at least one host device which is a home server and at least one client device, wherein when the client device is brought physically close to the host device, near field wireless communications are performed via a first RFID wireless communication system, connection setting information stored in an electronic memory of the home server is automatically transferred to an electronic memory of the client device via the first wireless communication system, wherein the server authenticates the client device based on a comparison of connection setting information stored at and transmitted from the client device back to the server via the first wireless communication system, the client device is permitted to perform wireless communications via the second wireless communication system with the host device as a peer to peer connection after the server authenticates the client device, and wherein when the client device has not been successfully authenticated, the client device is not permitted to perform wireless communications via the second wireless communication system with the host device, and further wherein after communication between the host device and the client device via the second wireless communication system is completed, authentication via the first wireless communication system is required before the host device again enables wireless communication with the client device via the second wireless communication system.

2. The wireless connection system as set forth in claim 1, wherein a communication range of the near field wireless communications is one meter or less.

3. A wireless communication method performed by at least one host device which is a home server and at least one client device, the method comprising:

bringing the client device physically close to the host device and performing near field wireless communications between the host device and the client device via a first wireless RFID communication system, wherein connection setting information stored in an electronic memory of the home server is automatically transferred to an electronic memory of the client device via the first wireless communication system; and the server authenticating the client device based on a comparison of connection setting information stored at and transmitted from the client device back to the server via the first wireless communication system;

wherein when the client device has been successfully authenticated by the server, the client device is permitted to perform wireless communications via the second wireless communication system with the host device as a peer to peer connection, and wherein when the client device has not been successfully authenticated, the client device is not permitted to perform wireless communications via the second wireless communication system with the host device, and further wherein after communication between the host device and the client device via the second wireless communication system is completed, authentication via the first wireless communication system is required before the host device again enables wireless communication with the client device via the second wireless communication system.

* * * * *